J. SHEEHAN & G. H. GILMAN.
SELF PROPELLED FREIGHT TRUCK.
APPLICATION FILED MAY 2, 1913.
1,113,584.
Patented Oct. 13, 1914.
2 SHEETS—SHEET 1.
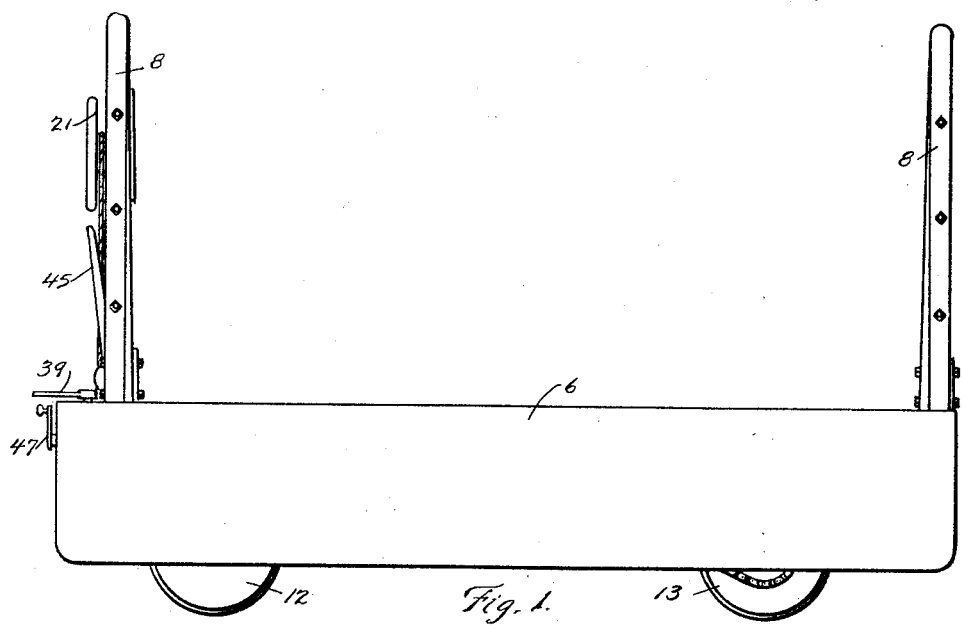
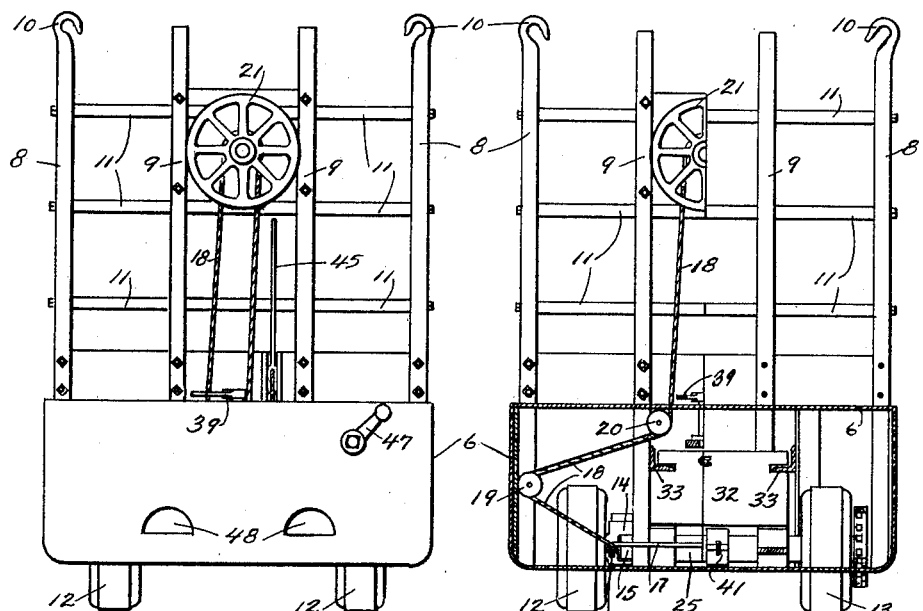
WITNESSES:
Walter H. Kelley
Bessie E. Dempsey
INVENTORS:
John Sheehan
and George H. Gilman
BY
J. Wm. Ellis
ATTORNEY.

J. SHEEHAN & G. H. GILMAN.
SELF PROPELLED FREIGHT TRUCK.
APPLICATION FILED MAY 2, 1913.
1,113,584.
Patented Oct. 13, 1914.
2 SHEETS—SHEET 2.
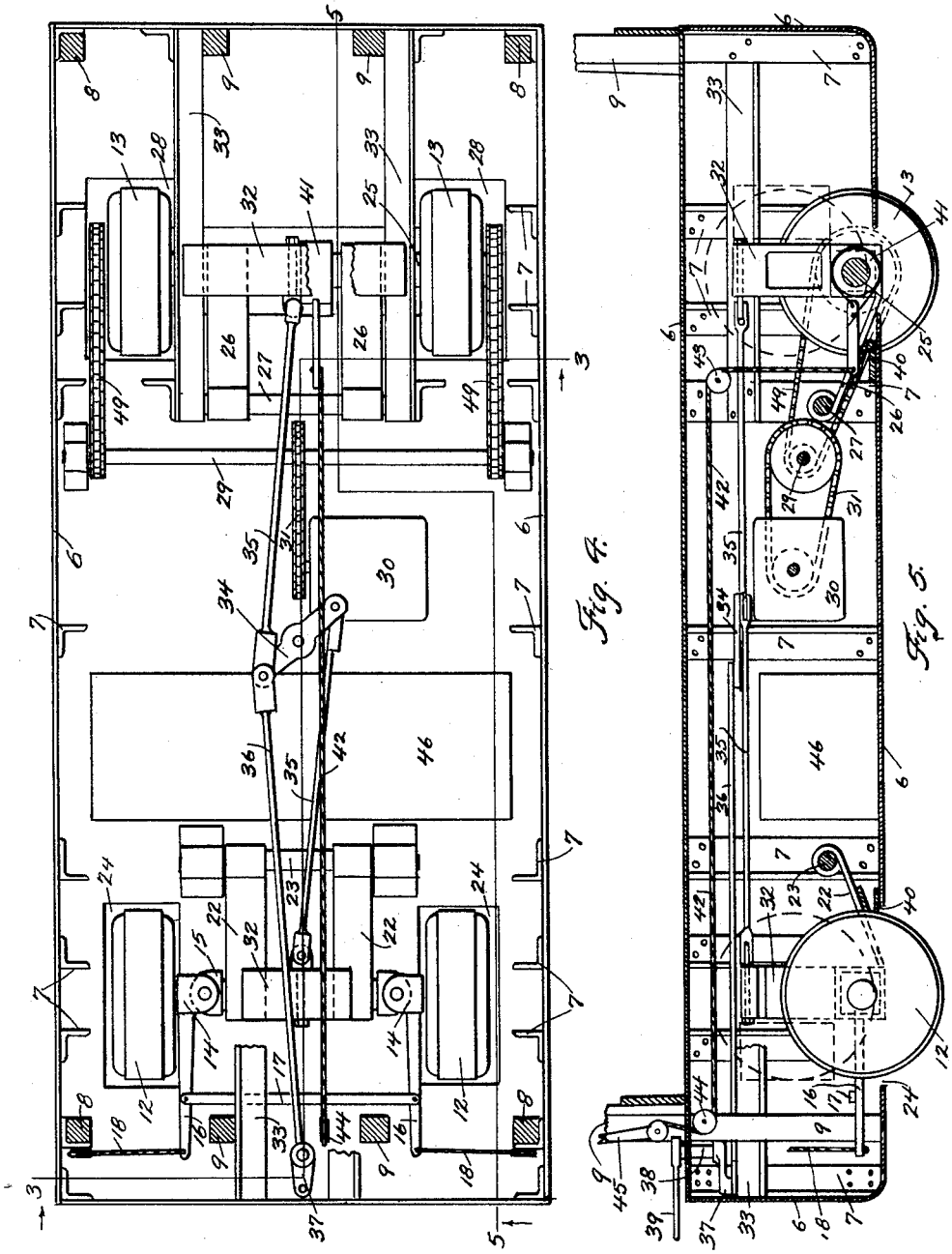

UNITED STATES PATENT OFFICE.

JOHN SHEEHAN AND GEORGE H. GILMAN, OF BUFFALO, NEW YORK.

SELF-PROPELLED FREIGHT-TRUCK.

1,113,584. Specification of Letters Patent. Patented Oct. 13, 1914.

Application filed May 2, 1913. Serial No. 765,085.

*To all whom it may concern:*

Be it known that we, JOHN SHEEHAN and GEORGE H. GILMAN, citizens of the United States of America, and residents of the city of Buffalo, county of Erie, and State of New York, have invented certain new and useful Improvements in Self-Propelled Freight-Trucks, of which the following is a full, clear, and exact description.

Our invention relates generally to freight handling devices and more particularly to a truck arranged to be self propelled to any desired point.

The principal object of our device has been to provide a truck which may be raised from or lowered into the hold of a vessel, after having been loaded and moved to any desired place in a vessel or warehouse without having to unload the freight and handle it a second time. Moreover, the wheels of our truck are so arranged that they will move up into the body of the truck when the same is lowered into the hold of a vessel or elsewhere and set upon freight while being loaded or unloaded. Thus the truck presents a flat bottom which will not injure the freight upon which it is set.

Another object has been to provide a device which shall be very strong and durable and by which freight may be conveniently and quickly handled with a minimum amount of manual labor. Furthermore, we have sought to provide a truck which shall be very compact and thus have its top surface very close to the ground level, whereby it may be easily loaded and unloaded.

Reference is to be had to the accompanying drawings, forming part of this specification, in which like characters of reference indicate like parts, throughout the several views of which:

Figure 1 is a side elevation of our truck. Fig. 2 is a front elevation of the same. Fig. 3 is a sectional elevation of our device taken on line 3—3 of Fig. 4. Fig. 4 is a top plan view of our device with the floor of the truck removed. Fig. 5 is a sectional elevation of our truck taken on line 5—5 of Fig. 4.

In the drawings, 6 represents the casing of our truck which is preferably made of sheet steel properly braced and strengthened by means of the angle irons 7. 8, 8 and 9, 9 are uprights which are securely and firmly attached at their lower ends to the truck casing 6 near each end of the truck. The uprights 8, 8 are placed preferably at the corners of the truck and have provided at their upper ends hooks 10, 10. Braces 11, 11 extend across between the uprights 8, 8 and 9, 9 and firmly hold the same together at their upper ends.

Our truck is provided with front steering wheels 12 and rear driving wheels 13. The steering wheels 12 are rotatably mounted upon steering knuckles 14 pivotally carried at the outer ends of the shaft 15. The knuckles 14 are each provided with an outwardly extending arm 16 which are connected together by means of the rod 17, whereby they are operated in unison. The outer end of each of the arms 16 has secured thereto the steering cable 18 which passes over suitable idlers 19 and 20 carried by the casing 6 and thence around the sheave of the steering wheel 21. The said steering wheel is located at some convenient point and is secured preferably to the uprights 9, 9 at the operating end of the truck. The shaft 15 is carried at the outer ends of arms 22, pivotally secured at their inner ends to a shaft 23 suitably carried by the frame work of the truck, whereby the shaft 15 may be vertically moved. Thus the steering wheels 12 may be allowed to project through the slots 24 provided in the bottom of the casing 6 or may be raised up within the casing so as to be flush with the bottom thereof.

The driving wheels 13, 13 are rigidly mounted on a shaft 25 which is carried at the outer ends of the arms 26, pivotally secured to the shaft 27, supported in any suitable way by the frame work of the truck. Slots 28 are provided through the bottom of the casing 6 through which the wheels 13 may project when in their operating position. When not in use, these wheels may be swung up within the casing so as to be flush with the bottom surface thereof.

29 is a jack-shaft which is rotatably mounted in suitable bearings carried by the frame work of the truck and 30 is the electric motor which provides the motive power for our device. The jack-shaft 29 and motor 30 are connected together, preferably by means of the sprocket chain 31, which passes over suitable sprocket wheels secured to said jack-shaft and the shaft of the motor. 49 are the main driving chains of our device, each of which connects a sprocket wheel carried by each of the wheels 13 with sprocket wheels carried by the jack-shaft 29.

In order to prevent the wheels 12 and 13 of our device from moving up within the casing when it is desired to move the truck about, we provide blocks 32 which are slidably disposed, preferably upon the angle irons 33 and which are arranged to be moved to a point of engagement with the outer ends of the arms 22 and 26. Pivotally carried near the center of the truck is a double ended lever 34 and one of the blocks 32 is connected to each end of this lever by means of rods 35. The rod 36 connects one end of the lever 34 with a crank 37, mounted upon a shaft 38 and rotated by the operating lever 39. Thus when the crank 37 is operated, the double ended lever 34 will also be operated and either move the blocks 32 away from or toward each other. 40 are stops which are secured to the bottom of the casing 6 and which prevent the downward movement of the arms 22 and 26 and the wheels 12 and 13 beyond a predetermined point.

Arranged on the driving shaft 25 is a brake 41 and secured to the lever of the brake is an operating cable 42. This cable passes over suitable idlers 43 and 44 and has its outer end secured to the brake lever 45.

Within the casing of our device is carried a storage battery represented by the numeral 46. A suitable controller for the motor 30 is also provided (not shown) the operating lever 47 of which extends from the front of the truck and is preferably detachably secured to the controller so that the same may be taken off when the truck is being raised or lowered.

Our device operates as follows: When it is desired, for instance, to unload freight from a vessel, the hooks 10 carried by the uprights 8 at the corners of the truck are coupled onto suitable hoisting means and the lever 39 operated so as to throw the blocks 32 out of engagement with the arms 22 and 26. The truck is then lowered in the hold of the vessel and allowed to rest upon the freight, whereby, when the wheels 12 and 13 come in contact with the freight on which the truck rests they will be pushed up inside of the casing and thus the truck will not tend to injure or be injured by the freight. After the truck has been loaded with freight the same is again hoisted from the hold of the vessel and before being lowered to the dock or freight house floor, the lever 39 is again operated so as to bring the blocks 32 into engagement with the arms 22 and 26, so that when the loaded truck is lowered, it will rest upon the wheels. The hoisting means are now uncoupled and the operator places his feet in the apertures 48 provided in the front of the casing. He then moves the controller lever 47, thus applying power to the truck, so that by means of the steering wheel 21, it may be guided to the desired point where it is unloaded.

Obviously, many modifications of the details herein shown and described may be made without departing from the spirit of our invention or the scope of the appended claims, and we do not wish to be limited to the exact embodiment herein shown and described.

Having thus described our invention, what we claim is:

1. A truck comprising a chambered platform having a flat top and a flat slotted bottom, driving and steering wheels mounted to vertically move through the slots of said bottom and within said platform, and means for locking said wheels in a position to support and carry said truck.

2. A truck comprising a chambered platform having a flat top and a flat slotted bottom, driving wheels, motive power means connected with said driving wheels, steering wheels, means connected with said steering wheels for guiding the same, said driving and steering wheels being mounted to move vertically through the slots of said bottom and within said platform, and means for locking said wheels in a position to support and carry said truck.

3. A truck comprising a chambered platform having a flat top and a flat slotted bottom, two pairs of arms pivotally carried within the chamber of said platform, a pair of steering wheels carried by one pair of said arms and a pair of driving wheels carried by the other pair of said arms, whereby said wheels may vertically move through the slots of said bottom and within said platform, and means for locking said wheels in a position to support and carry said truck.

4. A truck comprising a chambered platform, two pairs of arms pivotally carried within the chamber of said platform, a pair of steering wheels carried by one pair of said arms and a pair of driving wheels carried by the other pair of said arms, whereby said wheels may vertically move within said platform, blocks slidably carried within said platform and engageable with the outer ends of said arms for locking said wheels in a position to support and carry said truck.

5. A truck comprising a chambered platform, two pairs of arms pivotally carried within the chamber of said platform, a pair of steering wheels carried by one pair of said arms and a pair of driving wheels carried by the other pair of said arms, whereby said wheels may vertically move within said platform, blocks slidably carried within said platform and means for moving said blocks, said blocks being engageable with the outer ends of said arm for locking said wheels in a position to support and carry said truck.

6. A truck comprising a chambered platform, two pairs of arms pivotally carried within the chamber of said platform, a pair of steering wheels carried by one pair of said arms and a pair of driving wheels carried by the other pair of said arms, whereby said wheels may vertically move within said platform, blocks slidably carried within said platform and engageable with the outer ends of said arms and means for moving said blocks comprising a double ended lever centrally, pivotally mounted within said chambered platform, rods connecting one of the ends of said lever to each of said blocks and means for oscillating said lever, whereby said wheels may be locked in a position to support and carry said truck.

7. A truck comprising a chambered platform, uprights near each corner of said platform, means for securing hoisting cables to the upper ends of said uprights, two pairs of arms pivotally carried within the chamber of said platform, a pair of driving wheels carried by one pair of said arms and a pair of steering wheels carried by the other pair of arms and blocks slidably carried within said platform and engageable with the outer ends of said arms, whereby said wheels may move vertically within said platform and be locked in a position to support and carry said truck.

In testimony whereof, we have hereunto signed our names in the presence of two subscribing witnesses.

JOHN SHEEHAN.
GEORGE H. GILMAN.

Witnesses:
J. WM. ELLIS,
WALTER H. KELLEY.

---

Copies of this patent may be obtained for five cents each, by addressing the "Commissioner of Patents, Washington, D. C."